Oct. 2, 1956 T. S. MAYNER 2,765,070
THREAD ADVANCING REEL
Filed Dec. 13, 1952 2 Sheets-Sheet 1

INVENTOR
THOMAS S. MAYNER
BY Philip J. Canepa
ATTORNEY

Oct. 2, 1956     T. S. MAYNER     2,765,070
THREAD ADVANCING REEL
Filed Dec. 13, 1952     2 Sheets-Sheet 2
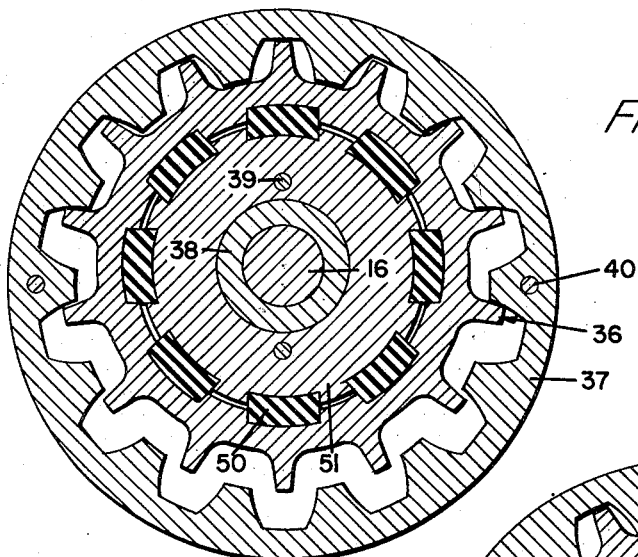
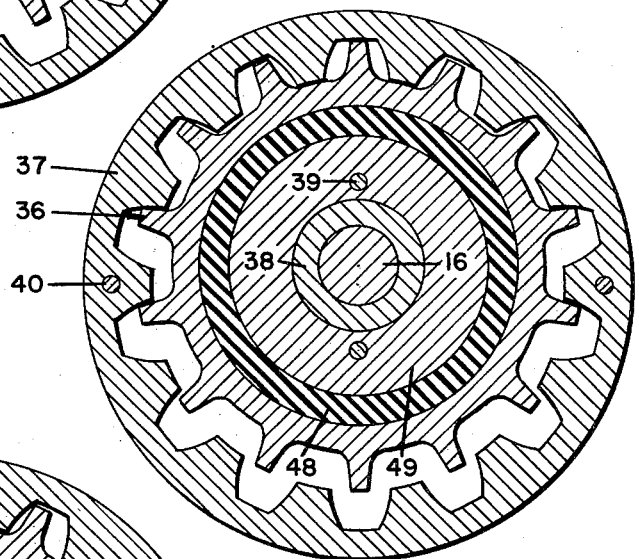
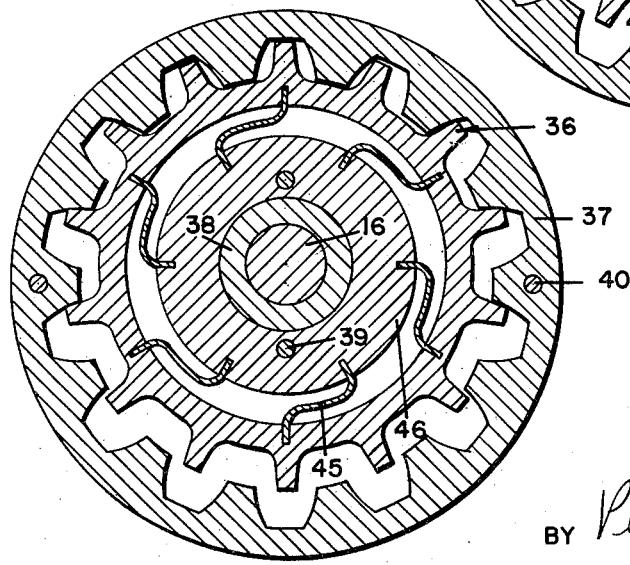
INVENTOR
THOMAS S. MAYNER
BY Philip J. Canepa
ATTORNEY

United States Patent Office 2,765,070
Patented Oct. 2, 1956

2,765,070

THREAD ADVANCING REEL

Thomas S. Mayner, Chagrin Falls, Ohio, assignor to Industrial Rayon Corporation, Cleveland, Ohio, a corporation of Delaware Application December 13, 1952, Serial No. 325,791

4 Claims. (Cl. 203—183)

This invention relates to thread-advancing reels, and more particularly to reels comprising two displaced reel members which during the rotation of the reel cooperate to advance thread lengthwise thereof in the form of a helix.

More specifically this invention relates to an improvement in driving gears in a thread-advancing reel of the type where each reel member has a periphery of longitudinally extending bar members, the bar members being in an interdigitating relation, and where the reel members are mounted for rotation about axes that are displaced relative to each other. Gear driving of reel members is advantageous in that constant speeds are maintained of the two reel members, distortion of the displaced reel member axes is minimized, and friction between bar members is eliminated.

The tendency to compress the reel members to alter the displacement of the axes, and to force frictional contact between the bar members as well as to destroy the ability of the reel to advance thread can occur during drying of thread. Also, flexing of the reel members can occur by the imposition of large numbers of thread turns forming a helix on the reel, the flexing may at times be sufficient to distort the axes to alter the normal advance of thread and to cause frictional contact between the bar members of the reel members. Other causes that may effect friction between bar members, and back-lash of the freely rotatable reel member, can arise from imperfect manufacture and poor material.

This invention provides for an improvement in reels based on the principle disclosed and described in the Knebusch Patent No. 2,210,914, and the Torrence et al. Patent No. 2,255,017. The Torrence patent discloses the use of related gears associated with each of the reel members comprising the reel for driving the freely rotatable reel member and to maintenance of its position relative to the fixed reel member. Each of the two gears in the reel is associated with its respective reel member so that at all times during rotation there is maintained a predetermined spacing between the bar members forming the reel periphery and, also, an elimination of back-lash of the freely rotatable reel member and a flexing of the bar members.

This invention provides for improved gearing which substantially eliminates for an extended period of time the possibility of relative motion between the reel members, or back-lash; which increases the life of the gears, as well as prolongs the utility of the reel itself. Advantageously, at least one of the driving gears attached to the reel members is resilient enabling it to position itself so as to conform and provide for a substantially full contact between contacting and driving gear teeth of the meshing gears. And being resilient, the gear can be placed under compression during meshing thus providing for a continued adjustment because of frictional wear of the gear teeth in contact.

The advantages of such drive gearing will be described in the following specification and the attached drawing, where:

Figure 3 is a cross-sectional representation of a further modification of a resiliently mounted reel member driving gear of Figure 2; and Figures 4 and 5 represent additional modifications of the resilient driving gear of Figure 2.

Figure 1:
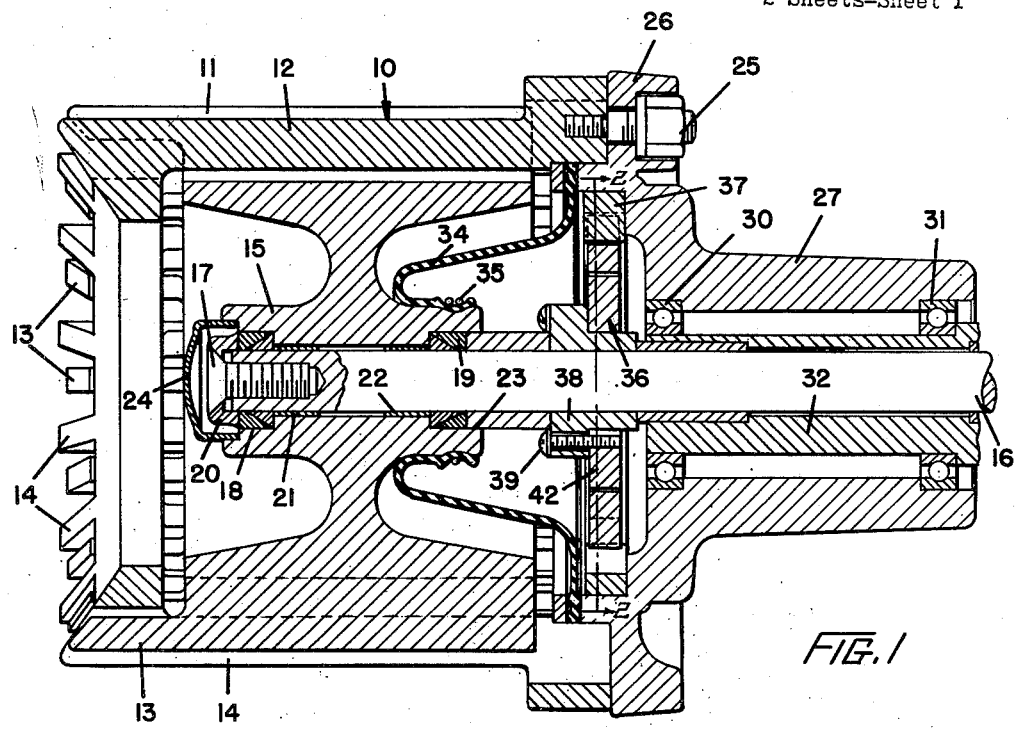
Figure 1 represents, in section, a thread-advancing reel embodying the reel member driving gears.

The reel of Figure 1, in general, is of the type disclosed in the Torrence et al. Patent No. 2,255,017. As therein shown, such a reel comprises two reel members, each having a periphery of a plurality of longitudinally extending bar members in interdigitating relation, and each reel member being mounted for rotation about an axis that are offset and askew relative to the other. Since one of the reel members is mounted on a shaft and fixed thereto, and the other member is mounted so as to freely rotate about such reel shaft, then by driving the reel shaft both reel members rotate and effect an advance of a thread over the reel periphery in the form of a helix.

The reel 10 of Figure 1 comprises a two member reel formed of reel members 11 and 12, each having a periphery of a plurality of longitudinally extending bar members 13, 14, respectively. Reel member 11 is fixedly mounted about the reel shaft 16 through its hub portion 15. The hub 15 is bound to the reel shaft 16 by means of split, compressible, friction binding washers 18, 19. The screw 17, by being threaded into the end of the shaft 16, draws or forces through the collar 20 the split wedge shaped, compressible, washers 18 and 19 against the shaft and the hub 15 against the abutting cylindrical sleeve 23 which is press-fitted onto the reel shaft. Spacer bushings 21, 22 are provided for positioning the hub 15 about the shaft 16. A protective cap 24 for the screw 17 is press-fitted into the end of hub 15.

The reel member 12 is eccentrically mounted about the shaft 16 and it is fixed by means of bolts 25 to the flange 26 of the hub member 27. The hub member 27 is mounted for rotation about the reel shaft 16 rotating on spaced bearings 30, 31, positioned about the eccentric sleeve 32. The axis of the sleeve 32 is offset and askew to the axis of the reel shaft 16. The shaft 16 extends through the eccentric sleeve 32 which is adapted to be stationarily supported by its flanged end (not shown). Thus, with the sleeve 32 being held stationary and the reel shaft 16 being driven, the reel member 11 will drive the reel member 12 either through frictional bar-to-bar contact or as shown through gears 36, 37. Thread on the reel will be advanced in the form of a general helix.

Since bar-to-bar contact is not desirable for thread processing operations the gear driving means of the freely rotatable reel member 12, such as the gears 36 and 37, provide for a definite and constant relation between the two reel members and the maintenance of the position of the reel member axes in their predetermined positions. The gear 36 is secured to the press-fitted sleeve or hub member 38 by screws 39, and the gear 37 is secured to the flange 26 of the hub member 27 by means of the screws 40 (see Figure 2). Inner gear 36 is an externally toothed gear meshing with the internally toothed annular gear 37.

Figure 2:
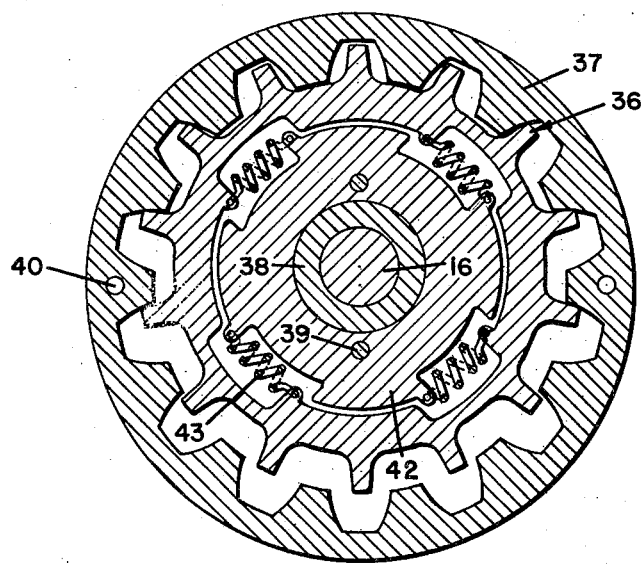
Figure 2 is a cross-sectional representation of one modification of a resilient reel member driving gear taken across lines 2—2 of Figure 1.

Ordinarily because of the offset and askew relation of the reel members to which the gears are attached a full contact, one where substantially the full width of a gear tooth meshes with the contacting gear tooth, is not had. In order to provide for a substantially full contact between the contacting gear teeth one of the gears must readjust itself from its normally determined position so that an improved and substantially full width contact between driving gear teeth can be had. Then, as shown in Figure 2, by resiliently mounting one of the gears a distortion of the gear mounting in the desired direction is effected to provide for an improved meshing of the contacting gear teeth. A resilient gear mount will considerably prolong the desired more positive contact between the driving gears, as well as it will prolong gear life by continually taking up the wear because of continued urging by the resilient gear mounting. The gear 36 when assembled is placed under compression into contact with the gear 37. The reel members 11, 12 are, as a result, maintained in a spaced relation through spaced gear tooth contact, and back-lash is substantially fully eliminated. Where, however, the gears are of solid construction, and generally irrespective of the material of which they are manufactured, continued angular contact between the gear teeth wears the contacting surfaces of the gear teeth which wear will create space therebetween. Neglect in the replacement of the gears will eventually lead to friction in bar contact, and to development of back-lash, as well as to a possibility of the distortion of the axes positions.

One form of a resiliently constructed driving gear is specifically shown in Figure 2. The gear 36 is mounted on annularly spaced springs 43 adapted to hold the gear 36 to a hub member 42 that is fixed to the sleeve 38. The gear 36, mounted and carried by the springs 43, will re-align itself in accordance with the angle of contact with the gear 37 to provide for a substantially full contact between the respective gear teeth irrespective of the offset and askew relation between the reel members. It is, also, placed under compression with the annular gear 37. The life of the respective gears, as a result of the resilient mounting of the inner gear 36, is prolonged and the tendency to back-lash is eliminated because, as wear between the gear teeth occurs, the continued urging of the gear 36 by the springs 43 into the annular gear 37 will take up such wear.

A further modification of the gear 36, making it adjustable as to angle of contact, is shown in Figure 3. The gear 36 in this figure is mounted in identical compressible, curvilinear springs 45. The springs 45 have one end secured in the mounting 46 and the other end secured in the gear 36. The gears and the rear section of the reel 10 are protected from corrosive fluids by a flexible seal 34 locked between the two reel members 11, 12 at one end and secured by a compression spring 35 to the hub 15.

Gear mountings subject to radial compression and to angular displacement made from materials other than from metal are shown in Figures 4 and 5. The gear 36 advantageously can be mounted on a cylindrical sleeve 48 made from rubber-like material cemented to the mounting 49 as shown in Figure 4, or the gear 36 may be mounted on spaced rubber-like inserts 50 also cemented and fitted to a mounting 51, as shown in Figure 5. Depending upon the kind of rubber-like material used angular displacement can be had to a desired relative degree and, also, the gear 36 can be placed under compression when in contact with gear 37.

There is provided by this invention as hereinabove described a gear arrangement for eliminating back-lash between reel members of a two-member reel and also for the avoidance of frictional contact between the bar members of the respective reel members. While only certain modifications have been shown which advantageously overcome the disadvantages herein stated, it is intended that this invention shall cover whatever features of patentable novelty that may reside as covered by the appendant claims.

I claim:
1. A thread-advancing reel comprising two interdigitating sets of bar members, each of said sets as a whole being mounted for rotation about an axis displaced from that of the other set, an internally toothed annular gear attached to one of said sets of bar members connected to rotate concentrically with said set, an externally toothed gear adapted to rotate concentrically with and being attached to said other set of bar members, said gears being in meshing relation and said externally toothed gear driving said annular gear and therethrough the connected set of bar members, a support including resilient means for mounting one of said gears, and said externally toothed gear being supported by said resilient means of said support and placed under compression so that upon meshing with said annular gear a substantially full gear tooth contact is had.

2. A thread-advancing reel in accordance with claim 1 in which the resilient means are metallic springs.

3. A thread-advancing reel in accordance with claim 1 in which the resilient means are of rubber-like material.

4. A thread-advancing reel comprising two interdigitating sets of bar members, each of said sets as a whole being mounted for rotation about an axis displaced from that of the other set and one of said sets being driven by the other through driving gears in meshing contact, an externally toothed annular gear associated with one of the said sets of bar members and adapted to rotate concentrically with said set, an internally toothed gear adapted to rotate concentrically with and being connected to the said other set of bar members, said externally toothed gear being positioned within said annular gear in driving relation, a support including resilient means for mounting one of said gears, and the said gear being supported by said resilient means placed under compression when positioned in meshing relation within said other gear.

References Cited in the file of this patent
UNITED STATES PATENTS

| | | |
|---|---|---|
| 550,334 | Snyder | Nov. 26, 1895 |
| 2,255,017 | Torrence et al. | Sept. 2, 1941 |